(12) United States Patent
Green et al.

(10) Patent No.: US 9,578,816 B2
(45) Date of Patent: Feb. 28, 2017

(54) STUMP CUTTING APPARATUS

(71) Applicants: Kevin J. Green, Blissfield, MI (US); Brian P. Holly, Onsted, MI (US)

(72) Inventors: Kevin J. Green, Blissfield, MI (US); Brian P. Holly, Onsted, MI (US)

(73) Assignee: Green Manufacturing, Inc., Morenci, MI (US)

( * ) Notice: Subject to any disclaimer, the term of this patent is extended or adjusted under 35 U.S.C. 154(b) by 970 days.

(21) Appl. No.: 13/886,523

(22) Filed: May 3, 2013

(65) Prior Publication Data

US 2014/0027017 A1  Jan. 30, 2014

Related U.S. Application Data

(60) Provisional application No. 61/643,059, filed on May 4, 2012.

(51) Int. Cl.
A01G 23/06 (2006.01)

(52) U.S. Cl.
CPC .................. A01G 23/067 (2013.01)

(58) Field of Classification Search
CPC ...... A01G 23/067; B27G 13/02; B27G 13/04; B27G 13/08; B27G 13/10; B23C 5/02; B23C 5/08; B23C 5/2204; B23C 5/2239
See application file for complete search history.

(56) References Cited

U.S. PATENT DOCUMENTS

| | | |
|---|---|---|
| 1,646,813 A | 10/1927 | Davey et al. |
| 2,996,291 A | 8/1961 | Krekeler |
| 3,256,043 A | 6/1966 | Krekeler |
| 3,318,348 A | 5/1967 | Oehrli |
| 3,570,566 A | 3/1971 | Mccreery |
| 3,642,214 A | 2/1972 | Blackwell, Jr. |
| 3,797,544 A | 3/1974 | Ver Ploeg |
| 3,844,619 A | 10/1974 | Haller |
| 3,935,887 A | 2/1976 | Van Zante et al. |
| 3,937,261 A | 2/1976 | Blum |
| 4,343,516 A | 8/1982 | Aden |
| 4,506,715 A | 3/1985 | Blackwell |
| 4,536,037 A | 8/1985 | Rink |
| 4,738,291 A | 4/1988 | Isley |
| 4,744,278 A | 5/1988 | Wright |
| 4,750,396 A | 6/1988 | Gaddis et al. |
| 4,759,394 A | 7/1988 | Clemenson |
| 4,812,087 A | 3/1989 | Stashko |
| 4,827,995 A | 5/1989 | Wilson |
| 4,932,447 A | 6/1990 | Morin |
| 4,974,649 A | 12/1990 | Manning |
| 4,998,574 A | 3/1991 | Beach et al. |
| 5,005,622 A | 4/1991 | Beach et al. |

(Continued)

FOREIGN PATENT DOCUMENTS

| | | |
|---|---|---|
| EP | 2659768 A1 | 11/2013 |
| WO | 03095164 A | 11/2003 |

*Primary Examiner* — Matthew G Katcoff
(74) *Attorney, Agent, or Firm* — Endurance Law Group, PLC

(57) ABSTRACT

A stump cutting apparatus including a cutting wheel with a plurality of tool holders secured to the cutting wheel. A plurality of apertures located in each of the tool holders. Each of said apertures having a cutting tool or tooth mounted therein whereby each tool holder supports more than one cutting tool or tooth.

19 Claims, 15 Drawing Sheets

(56) References Cited

U.S. PATENT DOCUMENTS

| | | |
|---|---|---|
| 5,042,733 A | 8/1991 | Hench |
| 5,063,731 A | 11/1991 | Hull et al. |
| 5,131,305 A | 7/1992 | MacLennan |
| 5,135,035 A | 8/1992 | Mills |
| 5,201,352 A | 4/1993 | Hult |
| 5,203,388 A | 4/1993 | Bowling |
| 5,205,199 A | 4/1993 | MacLennan |
| 5,211,212 A | 5/1993 | Carlson et al. |
| 5,248,188 A | 9/1993 | Walgren |
| 5,261,306 A | 11/1993 | Morey et al. |
| 5,269,355 A | 12/1993 | Bowen |
| 5,279,345 A | 1/1994 | LeMaux et al. |
| 5,289,859 A | 3/1994 | Minton et al. |
| 5,318,351 A | 6/1994 | Walker |
| 5,363,891 A | 11/1994 | Plante |
| 5,365,986 A | 11/1994 | Hooser |
| 5,381,840 A | 1/1995 | Bowen |
| 5,497,815 A | 3/1996 | Bowling |
| 5,623,979 A | 4/1997 | Bowling |
| 5,685,672 A | 11/1997 | Tjernstrom |
| 5,743,314 A | 4/1998 | Puch |
| 5,819,827 A | 10/1998 | Leonardi |
| 5,915,430 A | 6/1999 | Hooser et al. |
| 5,934,842 A | 8/1999 | Gupta |
| 6,024,143 A | 2/2000 | Ritchey |
| 6,089,480 A | 7/2000 | Rawlings |
| 6,138,725 A | 10/2000 | Leonardi et al. |
| 6,299,389 B1 | 10/2001 | Barazani |
| 6,382,277 B1 | 5/2002 | Paumier et al. |
| 6,484,766 B1 | 11/2002 | Falatok et al. |
| 6,546,977 B1 | 4/2003 | Monyak et al. |
| 6,698,477 B1 | 3/2004 | Bennington |
| 6,708,743 B2 | 3/2004 | Ziehm |
| 6,877,535 B1 | 4/2005 | Bennington |
| 7,104,294 B2 | 9/2006 | Kopocs et al. |
| 7,124,795 B2 | 10/2006 | Kammerer |
| 7,299,836 B2 | 11/2007 | Green |
| 7,380,889 B2 | 6/2008 | Frear |
| 7,418,986 B2 | 9/2008 | Watts |
| 7,484,541 B2 | 2/2009 | Green |
| 7,743,803 B2 | 6/2010 | Paumier |
| 8,020,591 B2 | 9/2011 | Kappel et al. |
| 8,522,843 B2 | 9/2013 | Kappel et al. |
| 8,672,001 B2 | 3/2014 | Leonardi et al. |
| 8,789,566 B2 | 7/2014 | Leonardi et al. |
| 2005/0217756 A1 | 10/2005 | Cao |
| 2006/0102247 A1 | 5/2006 | Green |
| 2008/0149224 A1 | 6/2008 | Kappel et al. |
| 2008/0190519 A1 | 8/2008 | Green |
| 2008/0196791 A1 | 8/2008 | Gossett |
| 2010/0218851 A1* | 9/2010 | Leonardi .................. B02C 7/12 144/235 |
| 2014/0338791 A1 | 11/2014 | Green et al. |
| 2015/0136276 A1 | 5/2015 | Green et al. |

* cited by examiner

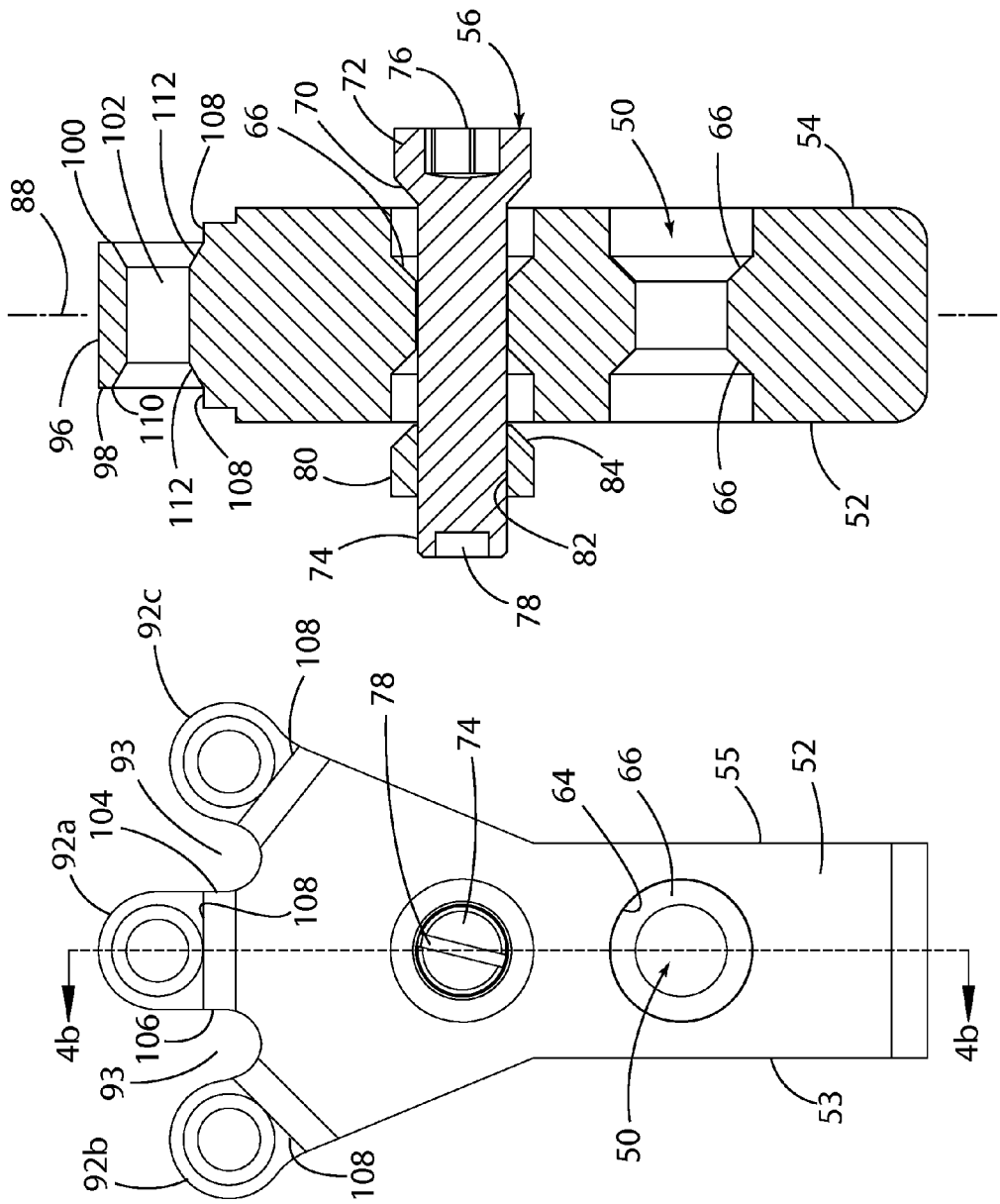

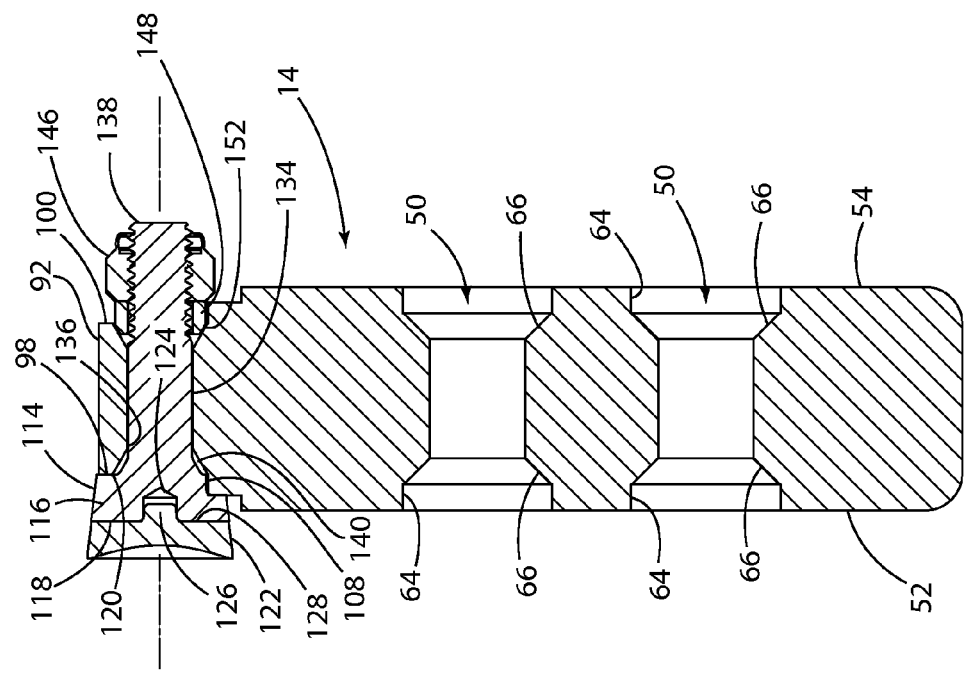
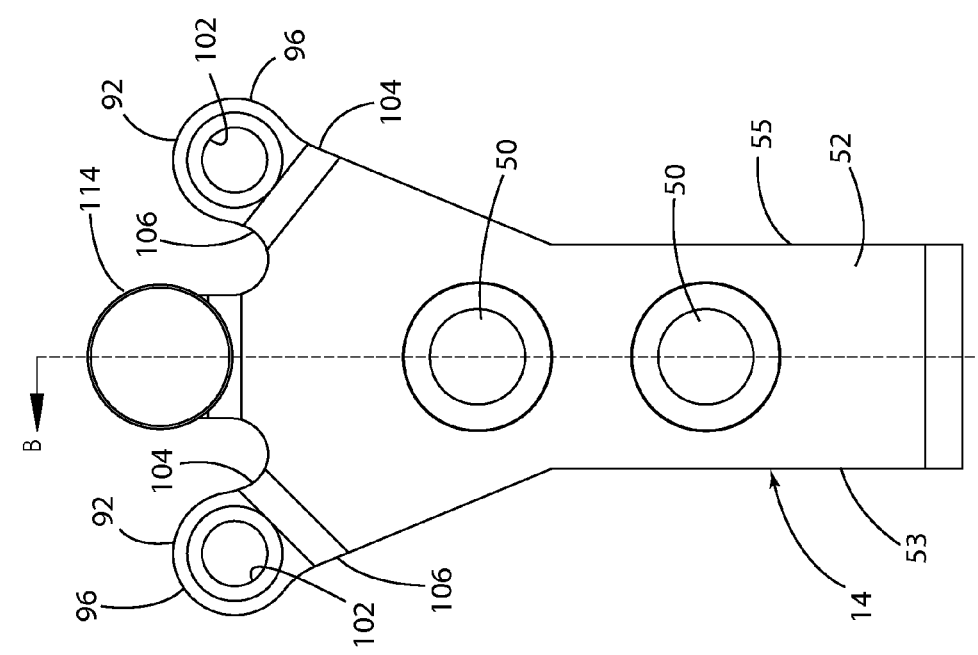
Fig. 5b
Fig. 5a

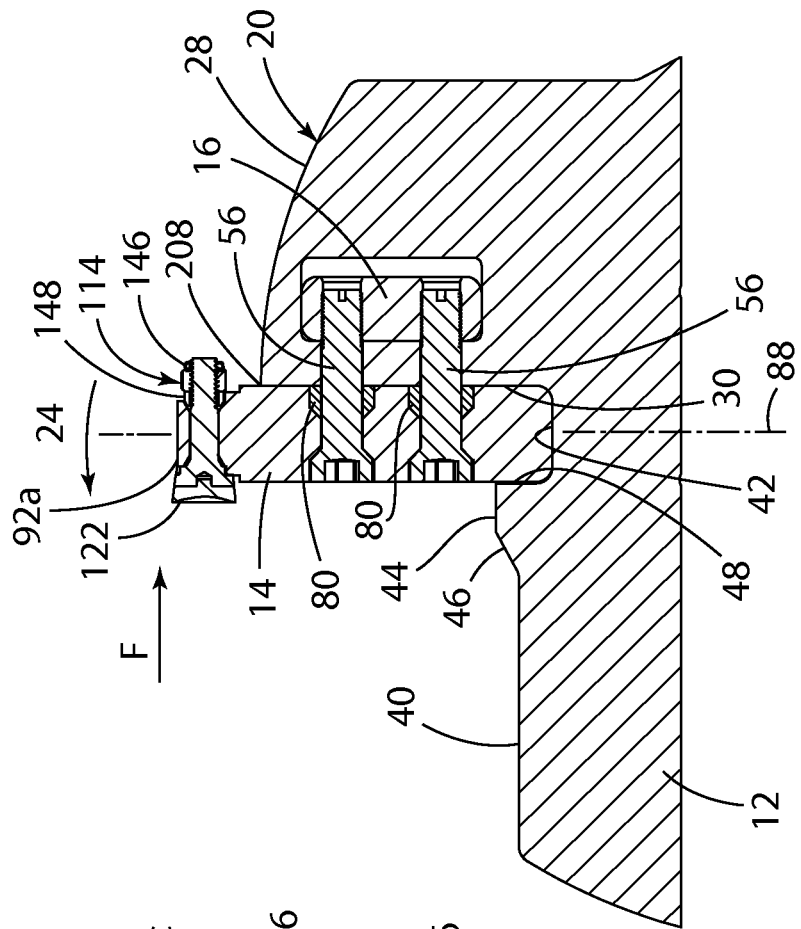
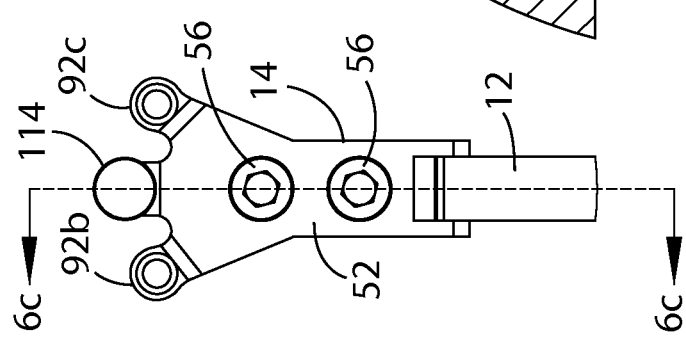
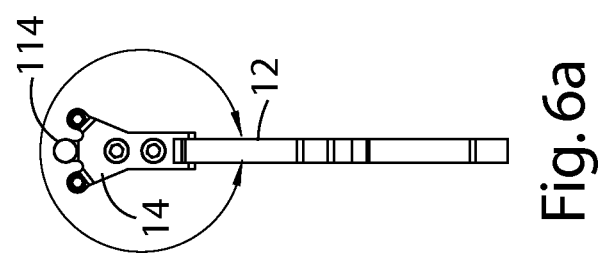
Fig. 6c
Fig. 6b
Fig. 6a

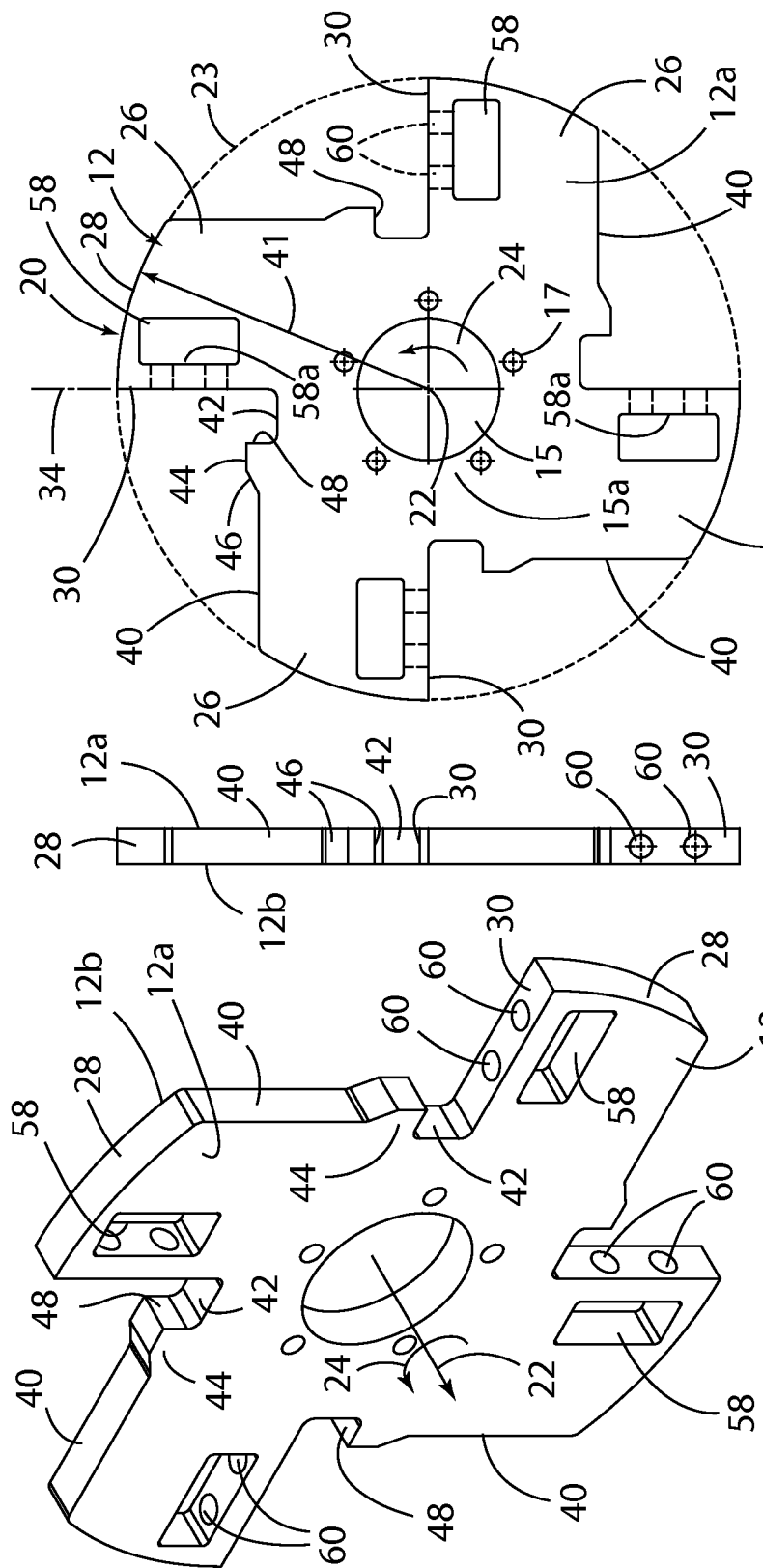

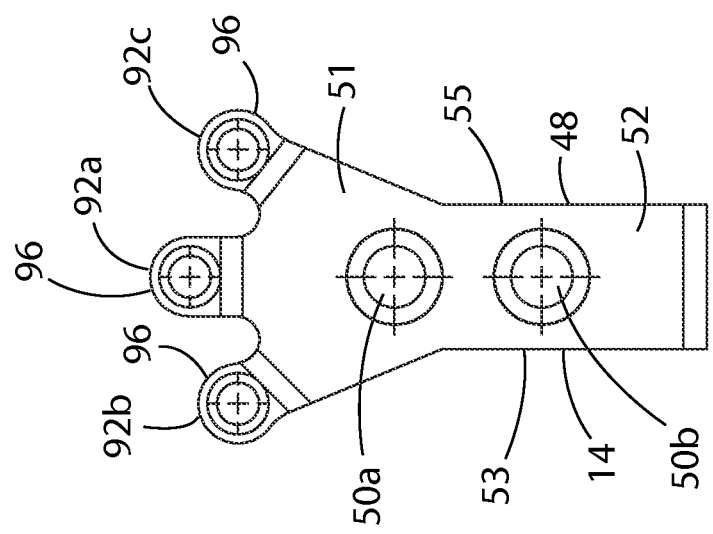
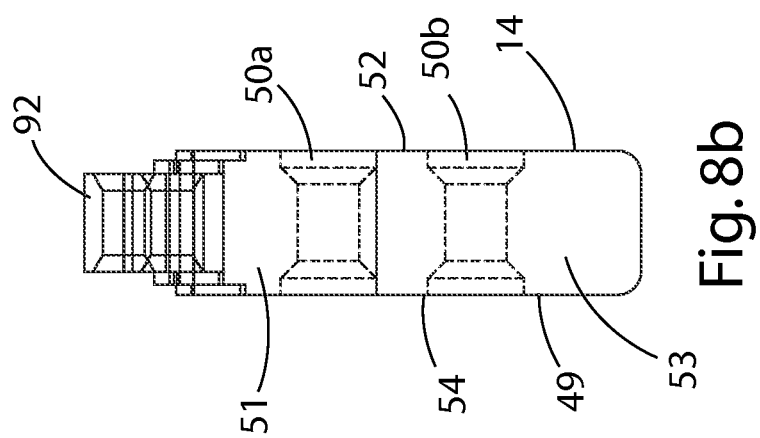
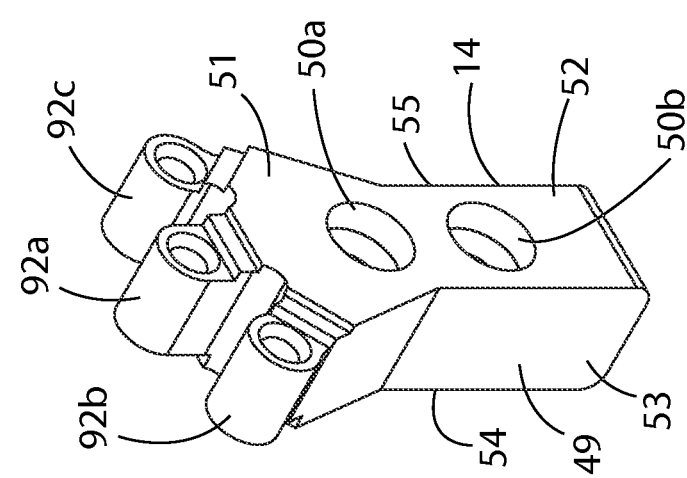

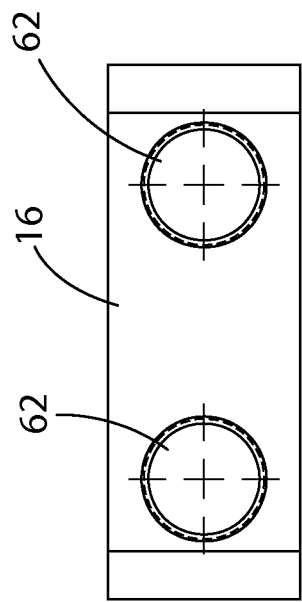
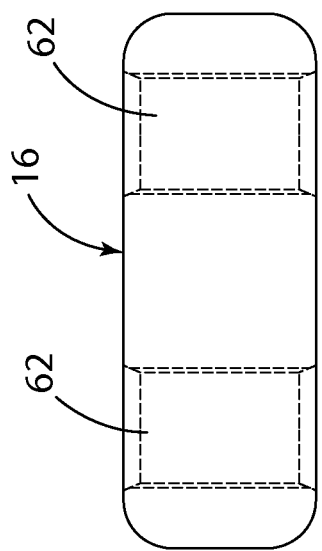
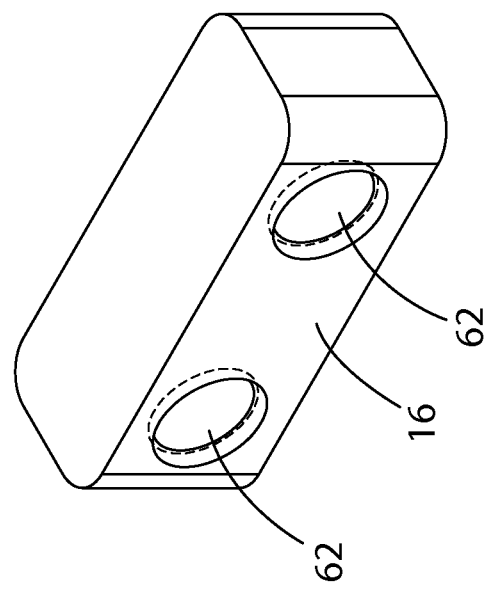
Fig. 9b
Fig. 9c
Fig. 9a

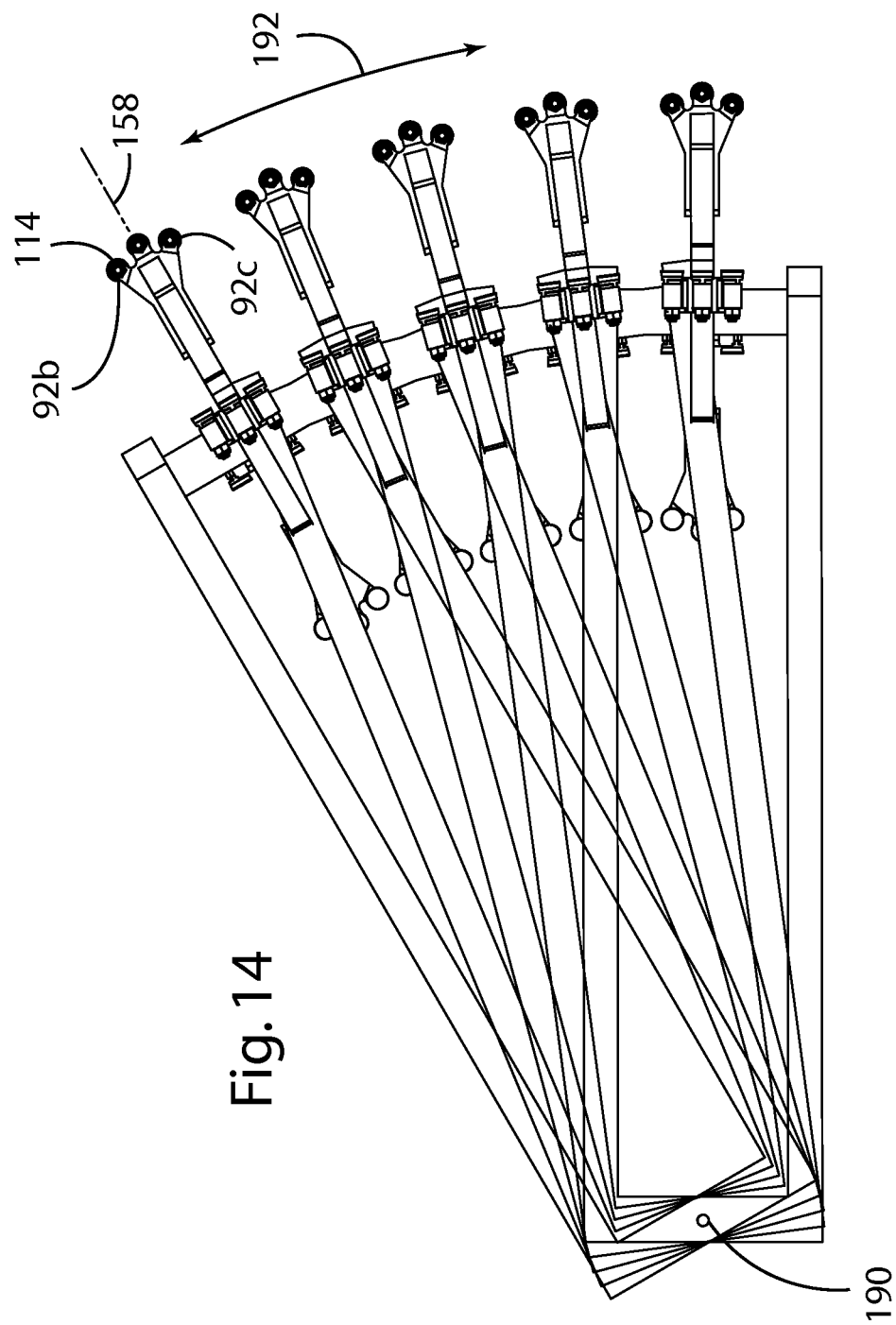

STUMP CUTTING APPARATUS

CROSS-REFERENCE TO RELATED APPLICATIONS

This application claims the benefit of U.S. Provisional Application No. 61/643,059, filed May 4, 2012.

BACKGROUND OF THE INVENTION

1. Field of the Invention

The present invention relates generally to a stump cutting apparatus and, more specifically, to a stump cutting apparatus having a rotating member or element and a cutting tool attached to the rotating member or element.

2. Description of Related Art

Various types of stump cutting devices are known. One type includes a rotatable member, such as a wheel or disk, having a plurality of cutting tools fastened to the peripheral edge thereof. Another type includes a rotatable member, such as a rotatable drum, having a plurality of cutting tools fastened to an outer circumferential surface thereof. During operation, the rotatable member; e.g., the wheel, disk or drum, rotates such that the cutting tools engage and cut the stump. Various types of cutting tools are used with either stump cutting apparatus. The cutting tool typically includes a tool holder secured to the cutting wheel or drum and a cutting tooth secured by the tool holder to the cutting wheel.

SUMMARY OF THE INVENTION

A stump cutting apparatus including a hub having an axis of rotation and a member extending outwardly from the hub and having a plane of rotation transverse the axis of rotation of the hub. The member includes a first side surface, a second side surface wherein the first side surface and second side surface are generally parallel to the plane of rotation of the member. A support surface extends between the first side surface and the second side surface with the support surface having a proximal end and a distal end. The distal end is closer to the hub. A tool holder is secured to the support surface. In one example of the present invention, the tool holder includes a plurality of apertures with each of the apertures having a cutting tool or tooth mounted therein. Accordingly, each tool holder supports more than one cutting tool or tooth.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIGS. 4a and 4b are a rear view of the tool holder and a fastener used to secure the tool holder 4a and a cross-sectional view taken along lines B-B showing the fastener extending through the tool holder 4b;

FIGS. 5a and 5b are a front view of the tool holder and cutting tool or tooth according to the present invention 5a and a cross-sectional view taken along lines B-B of FIG. 5a showing the cutting tool or tooth secured in the tool holder 5b;

FIGS. 6a-c are a partial front view of a stump cutting apparatus according to the present invention 6a, an enlarged front view of the tool holder as attached to a wheel of the stump cutting apparatus taken in circle b-b of FIG. 6a, and an enlarged partial cross-sectional side view of the stump cutting apparatus taken along lines d-d of FIG. 6b;

FIGS. 7a-7c are a perspective view of a wheel of the stump cutting apparatus according to the present invention 7a, a front view of a wheel of the stump cutting apparatus according to the present invention 7b, and a side view of a wheel of the stump cutting apparatus according to the present invention 7c;

FIGS. 8a-8c are a perspective view of the tool holder of the stump cutting apparatus according to the present invention 8a, a side view of the tool holder of the stump cutting apparatus according to the present invention 8b, and a front view of the tool holder of the stump cutting apparatus according to the present invention 8c;

FIGS. 9a-9c are a perspective view of a wheel block of the stump cutting apparatus according to the present invention 9a, a front view of the wheel block of the stump cutting apparatus according to the present invention 9b, and a side view of the wheel block of the stump cutting apparatus according to the present invention 9c;

FIG. 14 is a partial schematic view illustrating the swing path or arc of a stump cutting apparatus.

DETAILED DESCRIPTION OF THE PREFERRED EMBODIMENTS

The following description of the preferred embodiment(s) is merely exemplary in nature and is in no way intended to limit the invention, its application, or uses.

Figure 1:
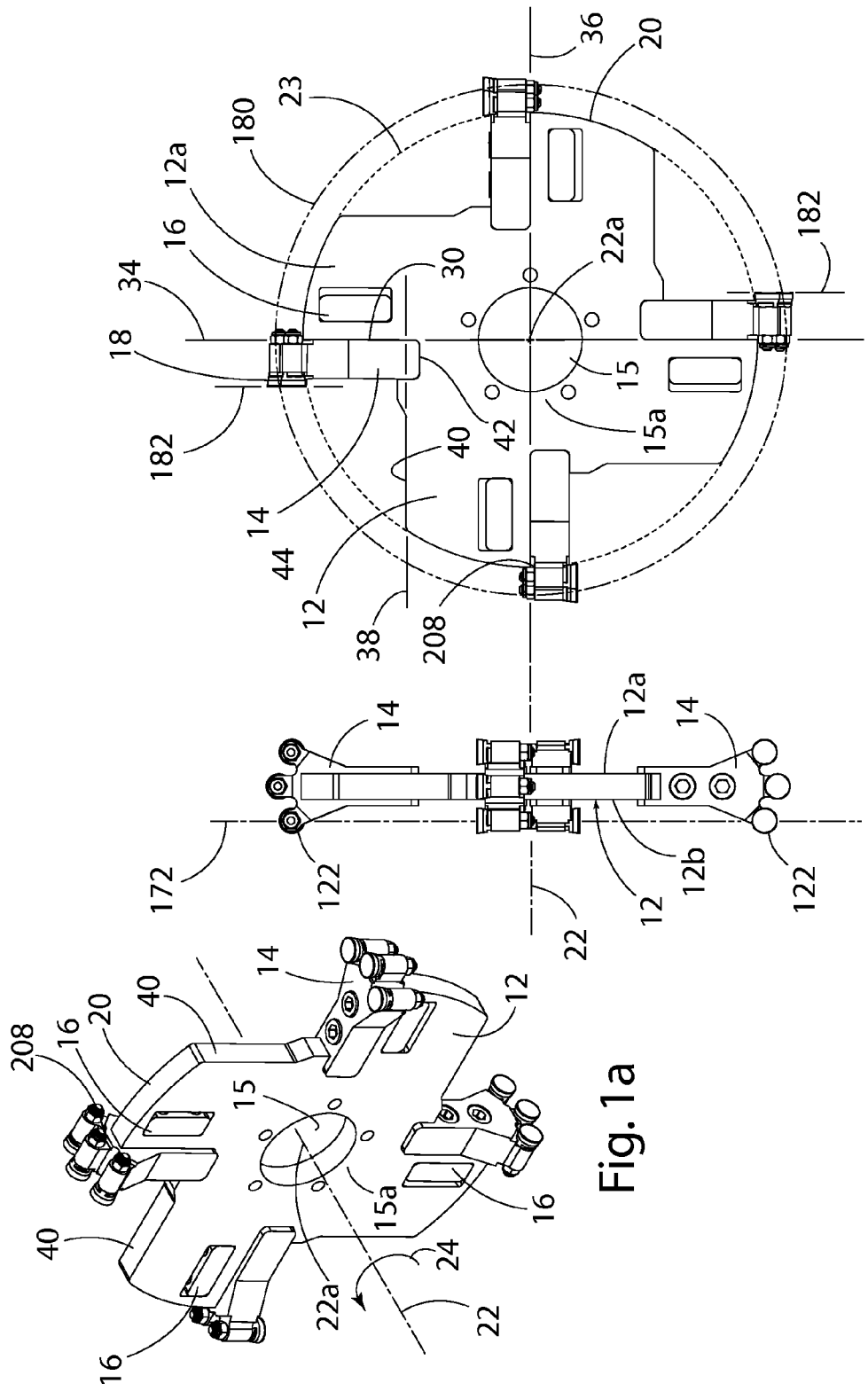
FIGS. 1a-1c are a perspective view 1a, a front view 1b, and a side view 1c of a stump cutting apparatus according to the present invention.
Figure 2:
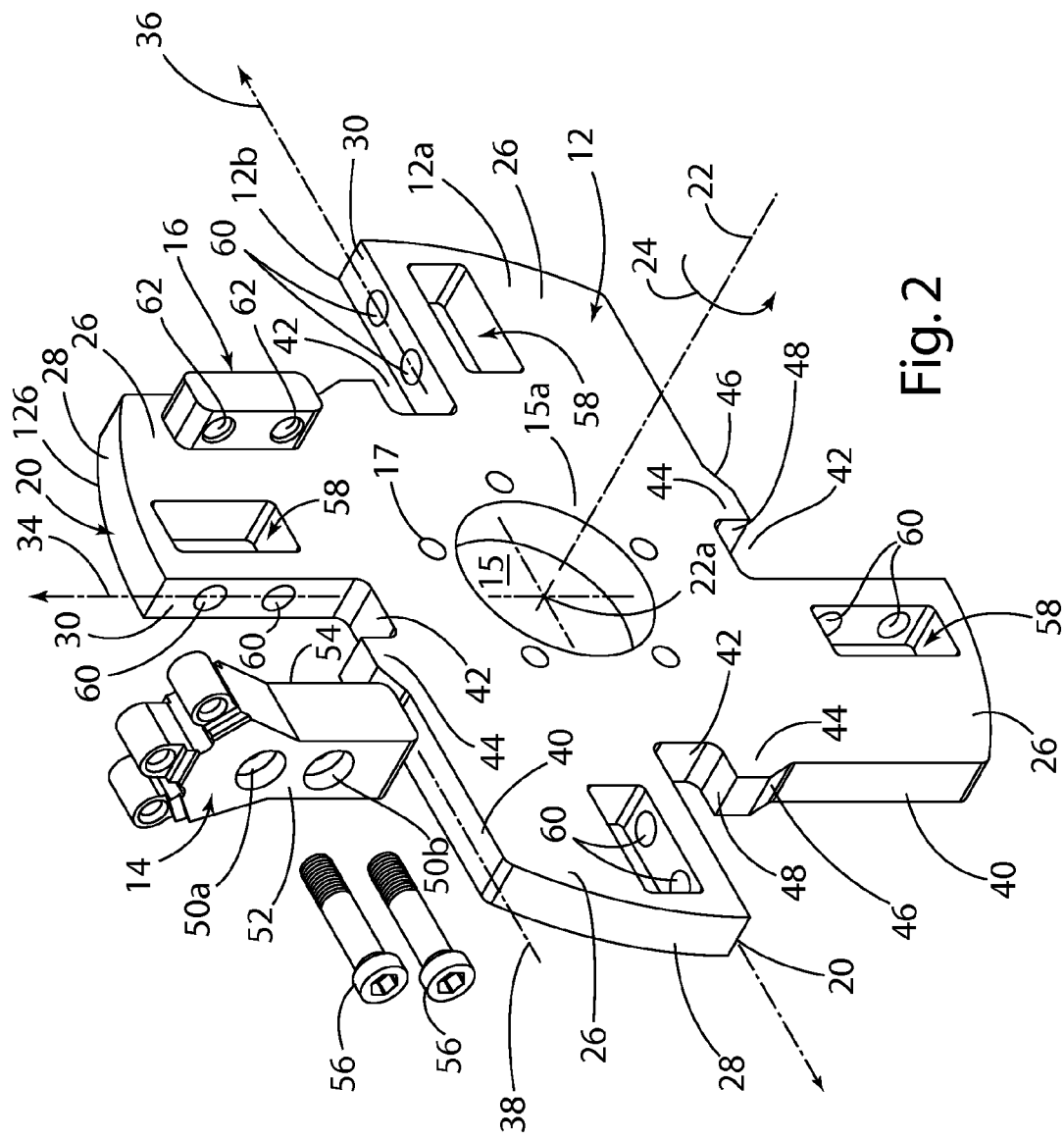
FIG. 2 is an exploded perspective view of a stump cutting apparatus according to the present invention.
Figure 3:
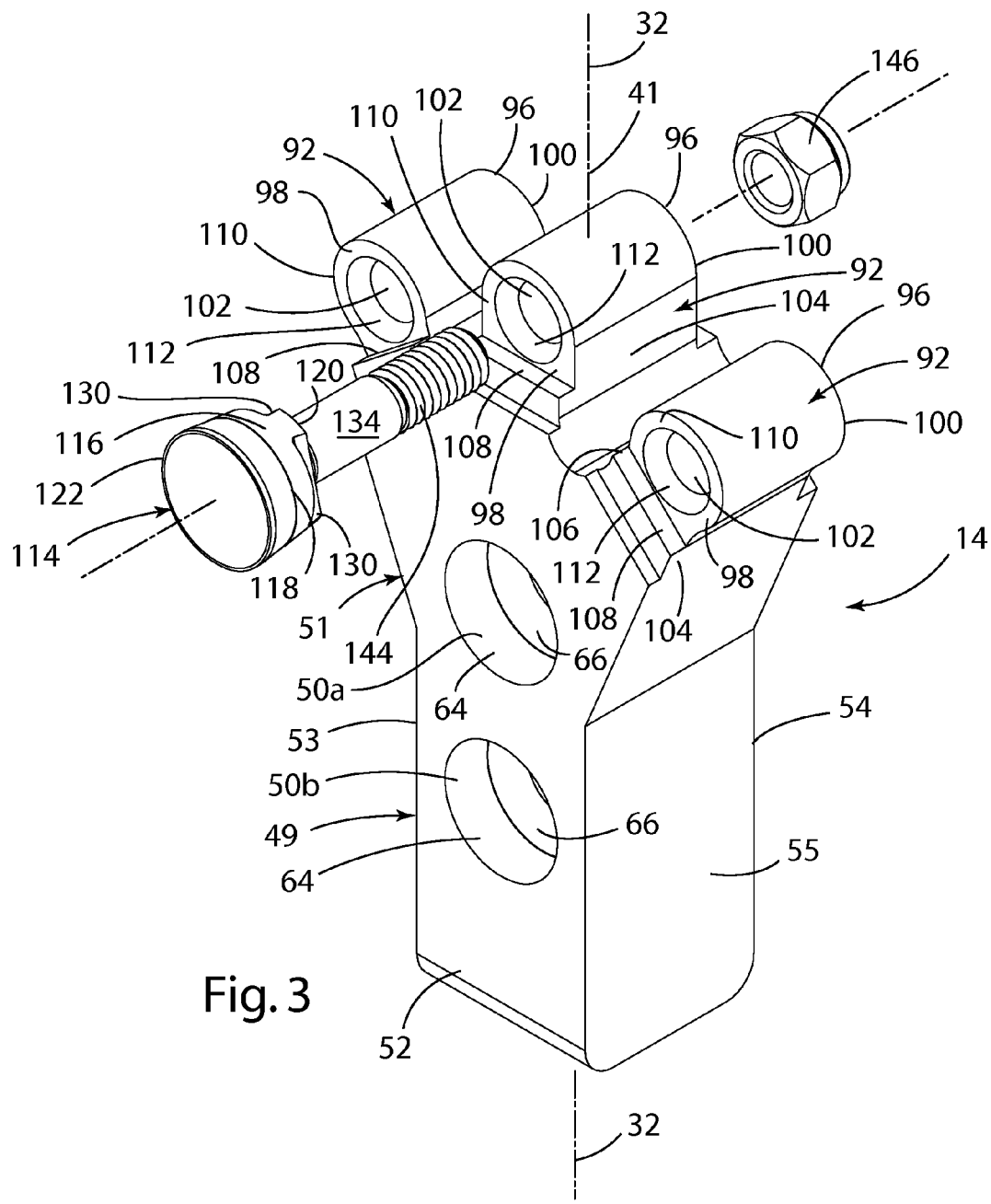
FIG. 3 is an exploded perspective view of a tool holder and cutting tooth of the stump cutting apparatus according to the present invention.
Figure 10C:
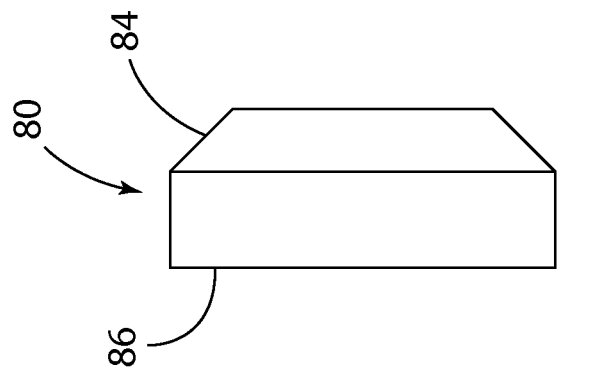
FIGS. 10a-10c are a rear perspective view of a spacer used in connection with the tool holder 10a, a front perspective view of the spacer 10b, and a side view of the spacer 10c of the stump cutting apparatus according to the present invention.
Figure 10B:
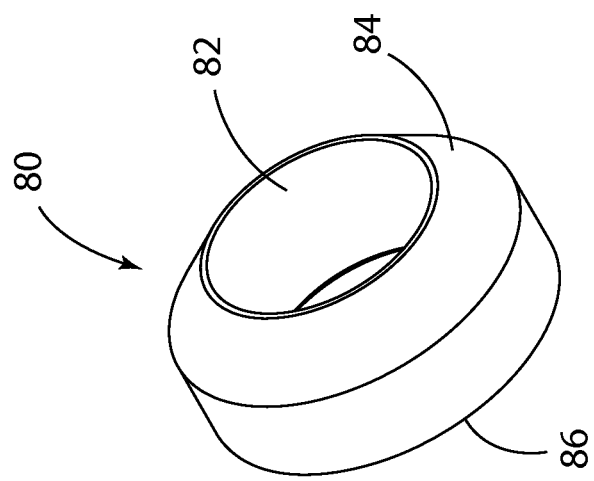
Figure 10A:
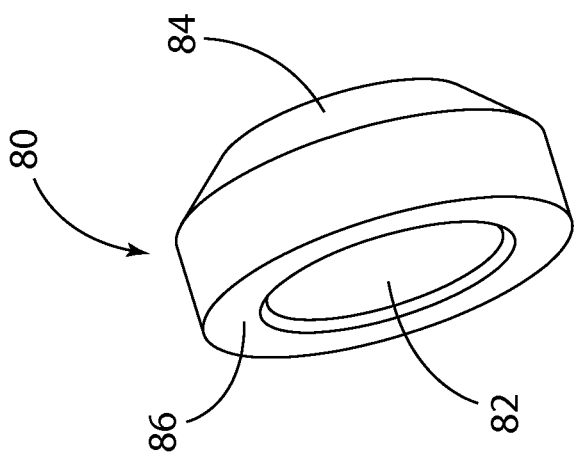

FIGS. 1a-1c illustrate a stump cutting apparatus, seen generally at 10, according to one embodiment of the present invention. The stump cutting apparatus 10 generally includes a wheel 12, a tool holder 14, a holder block 16, and a plurality of cutting tools or cutting teeth 18 secured to the tool holder 14. As illustrated, the cutting tools 18 are located about the periphery or peripheral edge 20 of the wheel 12.

FIGS. 2 and 7a-7c illustrate one example of the present invention wherein the wheel 12 is a plate-like member mounted for rotation about an axis 22 in the direction of the arrow 24. The wheel 12 rotates in a generally circular pattern as defined by a radius or radial 41 rotated about the axis 22. While the term "wheel" is used herein, it broadly refers to any member rotated about a hub in a manner similar to a wheel and is not limited to a circular disk. For example, one or more radially extending tool support segments 26 connected to the hub 15a would comprise a "wheel."

As illustrated in the disclosed example the wheel 12 includes side surfaces 12a and 12b and a generally arcuate outer surface 28 located at the periphery or peripheral edge 20 of the wheel 12. The wheel 12 further includes a central aperture 15 surrounded by a plurality of smaller apertures 17 suitable for securing the wheel 12 to a stump grinding machine. The area or portion 15a of the wheel 12 located about or around the central aperture 15 is generally termed the hub 15a. As illustrated in FIG. 7c the dotted lines 23 represent the circumference of the wheel 12 and show sections of the wheel 12 which have been removed thereby forming a plurality of outwardly extending members or tool support segments 26, as illustrated each of the tool support segments 26 extending outward in an arm-like fashion. While shown as a one piece member, the wheel 12 could be fabricated formed of two pieces including a hub 15a and at least one outwardly extending member or tool support segment 26 attached to the hub 15a.

As illustrated, the generally arcuate outer surface 28 forms the distal end of the tool support segment 26 and has a curvature associated with the circumference of the wheel 12 as established by the radius or radial 41 extending outwardly from the axis 22 and terminating at the peripheral edge 20. The curvature may change such that it is swept back and lies under the circumference of the wheel 12. Additionally, the configuration of the outer surface 28 of the tool support segment 26 may be something other than arcuate.

Each tool support segment 26 includes a forward facing support surface or mounting surface 30 extending outwardly along a radial 34 extending outwardly from the axis 22. As disclosed further herein, the tool holder 14 is connected to the wheel 12 at the support or mounting surface 30. The support or mounting surface 30 is a flat or planar surface extending between the respective sides 12a, 12b of the wheel 12. Thus, the plane of the support or mounting surface 30 lies in or is parallel to the axis 22 of rotation. Accordingly, the support or mounting surface 30 is a forward facing surface with respect to the direction 24 of wheel 12 rotation. FIG. 1c illustrates the respective support surfaces 30 of opposite tool support segments 26 extending along a line or plane passing through the axis 22. In the illustrated embodiment, the support or mounting surfaces 30 of the respective tool support segments 26 are located on or forward of a line or plane passing or extending through the axis 22 between opposing peripheral edges of the wheel 12; such as a line representing a diameter of the wheel 12. In an additional embodiment, the support surface 30 of the tool support segment 26 may be angled, canted or skewed with respect to the plane; however, in an additional embodiment the distal end of the support or mounting surface 30, that is the end at the intersection of the support or mounting surface 30 and the outer surface 28 of the tool support segment 26, remains at or forward of the plane. As used herein the terms forward and rearward are based upon the direction of rotation of the wheel 12 during the cutting operation. For example, since the tool support segments 26 rotate in the direction 24 about the axis 22, with the plane also rotating in the direction 24, the area to the left of the plane is forward in the area to the right is rearward. Thus, the proximal end of the support or mounting surface 30 may be located forward or rearward of the plane.

While the support or mounting surface 30 is illustrated in the disclosed example as planar, it may also be V-shaped, stepped, serrated, elliptical, concave or convex. Since the tool holder 14 is secured to the support or mounting surface 30, the tool holder 14 should have a corresponding or complementary shape to that of the support or mounting surface. In addition, the support or mounting surface 30 may have a width greater than the width or thickness of the wheel 12, with the width or thickness of the wheel being the distance between the respective side surfaces 12a, 12b of the wheel 12 at a location spaced from the support surface 30, for instance at the hub 15a. In one example, the support or mounting surface 30 may extend laterally outwardly whereby it has a width substantially equal to the width of the tool holder 14 with the width or thickness of the support surface 30 tapering inwardly until it reaches the width or thickness of the wheel 12. Increasing the width or lateral thickness of the support or mounting surface 30 provides additional support to the tool holder 14.

As illustrated, portions or sections of the wheel are removed, with the removed sections of the wheel 12 equating to that portion of the wheel 12 located in front of the support surface 30. The removed section includes an area subtended by a chord 38 intersecting with a radial 34 or line 36 extending through the center or rotational axis 22 of the wheel 12. Accordingly, the tool support segments 26 extend between a radial 34 or line 36 and a chord 38 of the generally circular cutting wheel 12; wherein the surface extending along the radial 34 or line 36 is the forward or support surface 30 and the surface extending along the chord 38 is the rear or trailing surface 40. While the removed sections cooperate with the tool support segments 26 to provide clearance and assist in mounting the tool holders 14, they also provide increased visibility during the cutting operation and reduce the overall weight of the stump cutting apparatus 10. If desired, the wheel 12 can be generally circular with a plurality of radially inwardly extending slots into which the holder blocks 16 are secured.

The rear or trailing surface 40 of the cutting wheel 12 provides access to the tool holder 14 located on the following or trailing tool support segment 26. It also provides clearance for the fasteners 56 used for securing the tool holder 14 to the support surface 30 of the tool support segment 26. As illustrated, the tool holder 14 is located in a slot or notch 42 formed by the support surface 30 and a shoulder 44 having a beveled leading surface 46 and a rear surface 48. As illustrated in FIGS. 1a-1c the tool holder 14 is placed in the slot or notch 42 and situated between the support surface 30 and the rear surface 48 of the shoulder 44. The rear surface 48 of the shoulder 44 provides support to the lower end of the holder 14 during the cutting operation. While the shoulder 44 provides additional support, it may be eliminated or removed.

Each tool support segment 26 includes a cavity or opening 58 located rearwardly of the support surface 30 of the tool support segment 26. A plurality of through bores or apertures 60 extend from the support surface 30 to the cavity or opening 58. The cavity or opening 58 is sized to receive the holding block 16. As illustrated in FIG. 7c the apertures 60 extend rearwardly from and substantially perpendicular to the support surface 30. In additional embodiments, the apertures 60 extend rearwardly but are skewed, either outward towards the periphery 20 of the wheel or inward toward the hub or rotational axis 22 of the wheel 12, with respect to the longitudinal axis/plane of the support or mounting surface 30. As illustrated, the apertures 60 extend rearwardly from the support or mounting surface 30 between the respective side surfaces 12a, 12b of the wheel 12. Accordingly, the apertures 60 lie in or are parallel to the plane of the wheel 12 rather than transverse or across the plane of the wheel 12.

As illustrated, in FIGS. 1a-1c and FIGS. 3-6c and 8a-8c according to the one example of the present invention, the tool holder 14 is a one piece member having a central longitudinal axis 32 and a mounting or base portion 49 and a tool support portion 51. The tool support portion 51 includes a plurality of outwardly extending arms or support members 92. The tool holder 14 further includes a front or leading surface 52 and a rear or trailing surface 54 interconnected by respective side surfaces 53, 55. As illustrated, when viewed from the front or leading surface 52 the tool support portion 51 is wider or larger than the base portion 49. In different embodiments, the width or size of the base portion 49 and tool support portion 51 are variable wherein each may be the same or similar size or the base portion 49 may be larger than the tooth support portion 51. Further, the tooth support portion 51 may be separable from the base portion 49 with the tool holder 14 fashioned as a two-piece or multi-piece member.

A plurality of apertures 50a, 50b extend through the tool holder from the front or leading surface 52 to the rear or trailing surface 54. The apertures 50a, 50b receive fasteners 56 used to secure the tool holder 14 to the cutting wheel 12. The fasteners 56 extend through the apertures 50a, 50b, the corresponding apertures 60 located in the tool support segment 26 and into threaded bores 62 located in the holding block 16. The threaded portions 74 of the fasteners 56 cooperate with the threaded bores 62 of the holder block 16 whereby rotation of the fasteners 56 draws the holder block 16 into engagement with the cutting wheel 12; specifically, the leading surface 58a of the cavity or opening 58. Continued rotation of the fasteners 56 draws rear or trailing surface 54 of the tool holder 14 into engagement with the support surface 30 of the tool support segment 26 of the cutting wheel 12. The holder block 16 cooperates with the fasteners 56 to secure the tool holder 14 on tool support segment 26 of the cutting wheel 12. The holder block 16 is sized such that it fits within the cavity or opening 58 thereby reducing abrasion or wear of the type typically seen when using a nut in a stump cutter apparatus. Since the holder block 16 is within the cavity or opening 58 it is not subjected to abrasive/wear forces occurring during the stump cutting/grinding operation. Additionally, use of the holder block 16 reduces the amount of parts necessary; specifically, only one holder block 16 is needed rather than two nuts.

As set forth previously, the width of the front or leading surface 52 of the tool holder portion 51 is wider than width of the front or leading surface the base portion 49. While shown with the respective sides 53, 55 tapering outwardly starting at a point located below the upper aperture 50a and continuing up to the support member 92 other shapes can also be used provided they support the respective cutting tools 114 in the spaced relationship to be described later. As illustrated in FIG. 6c the tool holder 14 is located on the wheel 12 wherein the lower end of the base portion 49 is positioned in the slot or notch 42 such that a portion of the front surface 52 of the tool holder engages the rear surface 48 of the slot or notch 42 and the rear surface 54 of the tool holder 14 engages the support surface 30. At least a part of the tool holder portion 51 extends above the contact point 208, with contact point 208 being that point where the rear surface 54 of the tool holder 14 contacts the generally arcuate outer surface 28 of the peripheral edge 20 of the wheel 14. Accordingly, as the wheel 14 rotates in the direction of the arrow 24 contact with a stump generates a force (F) on the cutting tool 114 and correspondingly the tool holder 14. The force (F) creates a moment about the contact point 208 that would cause the tool holder 14 to pivot about the contact point 208; however, the pivot force or moment is resisted both by locating the end or bottom of the tool holder in the slot or notch 42 and the fasteners 56. The force (F) generated during the stump cutting or grinding operation is transferred through the cutting tool 114 to the tool holder 14 and directly to the wheel 12 and correspondingly reducing the shear load placed on the fasteners 56. Thus the impact force of the cut or grinding operation is borne by the wheel 12 not the fasteners 56. Accordingly, the fasteners 56 act to secure the tool holder 14 to the wheel 12 with the shear load applied at the contact point 208. Reducing the shear load on the fasteners 56 reduces the potential for fastener or bolt 56 failure.

The fasteners 56 are oriented such that they extend in or are parallel to the plane of the cutting wheel 12. As shown, the fastener 56 is transverse to or crosses a radial 34 while remaining parallel to the plane of the cutting wheel 12. As illustrated in FIGS. 3-6 the apertures 50a, 50b of the tool holder 14 extend longitudinally in the same general direction as the apertures 102a-c located in the tool holder 14. That is, they are oriented in the direction of rotation 24 of the wheel 12.

While the holder block 16 is the preferred embodiment for securing the tool holder 14 to the wheel 12, the holder block 16 could be removed and the through bores or apertures 60 could be threaded. For example, the wheel 12 could have threaded apertures that threadably receive the fasteners 56 thereby eliminating the cavity or opening 58 in the wheel 12 and the holder block 16. In this instance, the fasteners 56 would extend into the wheel 12 in or parallel to the plane of the wheel 12. Using the holder block 16 in cooperation with the through bores or apertures 60 extending into the cavity or opening 58 provides a fastening arrangement that makes it easier to replace should the bolt or fastener 56 break; that is it is easier to remove the broken fastener and holder block 16 assembly rather than have to remove the broken fastener from a threaded aperture in the wheel 12. In addition, such an arrangement eliminates wear in the wheel should threaded apertures be used therein specifically, installation and removal of the tool holder 14 may cause the wallowing and potential stripping of the threaded apertures in wheel 12.

Turning now to FIGS. 3-5b, as set forth previously, the rear or trailing surface 54 is the surface that contacts or is placed adjacent to the support surface 30 of the tool support segment 26. As illustrated in FIG. 4b the apertures 50a, 50b may each include a countersunk portion 64 that includes a conical or beveled surface 66 that receives and mates with the conical or beveled shoulder 70 located on the head 72 of the fastener 56. As illustrated the fastener 56 has a threaded portion 74 and a drive socket 76 located on the head 72 of the fastener 56. The drive socket 76 is shown herein as a hexagonally shaped socket used to receive a hex head drive member. The threaded portion 74 of the fastener 56 also includes an engagement portion, shown herein as a slot 78 (see FIGS. 4a and 6c) used to remove the threaded portion should the fastener 56 fracture wherein the threaded portion 74 is separated from the head portion 72 and correspondingly the drive socket 76.

As illustrated in FIGS. 4*b* and 6*c* since the tool holder 14 is reversible; it is a mirror image about a plane 88 extending longitudinally between the front surface 52 and rear surface 54 of the tool holder 14 and perpendicular to the apertures 50. Accordingly, the tool holder 14 can be rotated 180° about a central longitudinal axis 32, see FIG. 3, whereby the front or leading surface 52 becomes the rear or trailing surface 54. The apertures 50 have opposed countersunk portions 64 each having a conical or beveled surfaces 66 located on both the front or leading surface 52 and a rear or trailing surface 54. In short, there are countersunk portions 64 on both surfaces 52, 54 suitable for receiving the head 72 of the fastener 56. Thus, should any damage result to the front or leading surface 64 of the tool holder 14 it may be flipped over and reattached to the cutting wheel 14 whereby the rear or trailing surface 54 becomes the front or leading surface 52.

Because there are countersunk portions on both surfaces 52, 54 a spacer 80 having an aperture 82, a conical or beveled surface 84 and a flat surface 86 is placed in the countersunk portion 64 located in the rear or trailing surface 54 of the tool holder 14 located opposite the head 72 of the fastener 56. The spacer 80 is sized to fit into and fill the countersunk portion 64 located in the rear or trailing surface 54 whereby the rear or flat surface 86 is flush with the rear or trailing surface 54 such that it engages the support surface 30 on the tool support segment 26.

As disclosed, the tool holder 14 also includes a cutting tool or cutting tooth 114 located on the arm or support member 92 extending outwardly from the tool support portion 51. As illustrated the tool holder 14 includes a plurality of individual arm members 92, including a center arm member 92*a*, a left arm member 92*b* and a right arm member 92*c* with each of the arms being separate from one another with a space or gap 93 located between adjacent arm members 92*a*-92*c*. The gap 93 providing a path for chip flow and reducing the profile of the tool holder 14 and correspondingly chip deflection. Further, as set forth below, depending upon the location of the cutting tool or tooth 114, the space or gap 93 reduces the opportunity for the tool holder 14 to strike the stump during the cutting or grinding operation.

A cutting tool or tooth support portion 96 is located at the end of the arm or support member 92 and extends longitudinally in a direction between the respective front or leading surface 52 and rear or trailing surface 54. The tooth support portion 96 includes first and second ends 98, 100 with an aperture 102 extending longitudinally through the tooth support portion 96 between the first and second ends 98, 100. As illustrated herein, the tooth support portion 96 includes an inner surface as defined by the aperture 102 and an outer surface. The outer surface of the tooth support portion 96 may be greater than the width or thickness of the arm or support member 92, with the thickness defined as the distance between the respective side surfaces 104, 106 of each surface of the arm or support member 92. A pair of flat surfaces or shoulders 108 are located on the arm or support member 92 adjacent the first and second ends 98, 100 of the boss 96. The first and second ends 98, 100 have a generally planar or flat surface 110 with a chamfered portion 112 extending between the flat surface 110 and the aperture 102. As illustrated, the chamfered portions 112 are located at both ends of the aperture 102.

As illustrated, the tooth support portion 96 of the tool holder 14 supports a cutting tool often referred to as a cutting tooth 114 having a head 116. The head 116 having a front surface 118 and a rear surface 120. A cutting tip 122 is attached to the front surface 118 of the head 116. The cutting tip 122 is generally cylindrical in shape and the front surface thereof has a generally concave shape which terminates prior to or at the periphery of the cutting tip 122. The front surface 118 of the head 116 may include a shallow depression or indentation 124 sized to receive a corresponding projection 126 extending outward from the rear surface 128 of the cutting tip 122. The complementary indentation 124 and projection 126 are such that the projection 126 functions to properly locate and orient the cutting tip 122, typically made of a hard material such as carbide, on the head 116 prior to attaching the cutting tip 122 to the head 116 through one of several known processes including brazing.

As illustrated, the head 116 has a generally cylindrical shape that tapers rearwardly from the front surface 118 toward the rear surface 120. A plurality of planar indentations 130 are located about the outer circumferential surface of the head 116. As illustrated in the disclosed embodiment, the planar indentations 130 are spaced from one another a predetermined amount, illustrated herein as 120°. When the planar indentations 130 located on the head 116 matingly engage the planar or flat surface or shoulder 108 located on the arm member 92 they cooperate with the shoulder 108 to resist rotation of a cutting tool or tooth 114 about its longitudinal axis 132. The multiple planar indentations 124 located on the head 116 of the cutting tool or tooth 114 make the cutting tooth 114 indexable.

The cutting tool or tooth 114 further includes a shank 134. The shank 134 has a proximal end 136 and a distal end 138 with the proximal end 136 attached to the rear surface 120 of the head 116. A fillet 140 extends between the rear surface 120 of the head 116 and the outer periphery of the shank 142. The fillet 140 is a chamfered surface extending between the respective rear surface 120 of the head 116 and the shank 134 and operates to reduce the stress concentration at the joint between the head 116 and the shank 134. As illustrated, the shank 134 is a generally cylindrical member. The distal end 138 of the shank 134 includes a threaded portion 144.

Accordingly, the cutting tool or tooth 114 is installed or positioned in the aperture 102 located in the arm member 92 by inserting the distal end 138 of the shank 134 in the aperture 102 and pushing the shank 134 through the aperture 102 until the head 116 of the cutting tool or tooth 114 is placed adjacent the first or front end 98 of the boss 96 and the threaded portion 144 extends outwardly past the rear or second end 100. A nut 146 threadably engages the threaded portion 144 to secure the cutting tool or tooth 114 to the arm member 92. Since both the first or front end 98 of the boss 96 and the second or rear end 100 of the boss 96 both have chamfered portions 112 adjacent the flat surfaces 110 a spacer 148 having an aperture 150 is placed between the boss 96 and the nut 146. The spacer 148 includes a chamfered or beveled portion 152 that engages the chamfered portion 112 of the boss 96 when the nut 146 is tightened to secure the cutting tool or tooth 114 to the arm member 92 of the tool holder 14. The spacer 148 also functions to provide additional clearance for the nut 146 as it moves the nut 146 rearwardly along the longitudinal axis 132 of the cutting tool or tooth 114 such that it clears the respective shoulder 108 of the boss 96. Accordingly, the nut 146 acts on the spacer 148 whereby the diameter or overall size of the nut 146 is not limited by the shoulder 108 of the boss 96.

Figure 12:
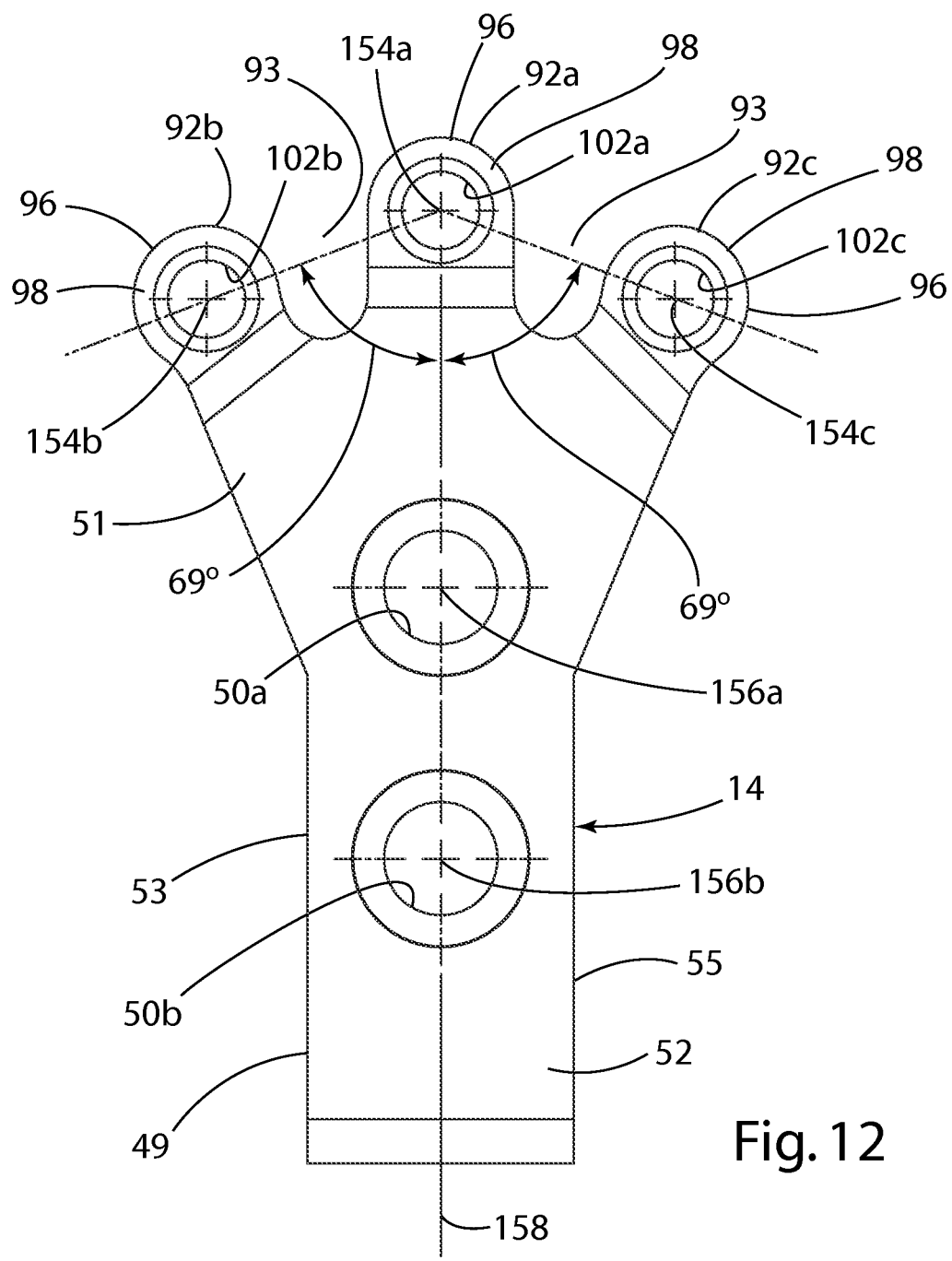
FIG. 12 is a front view of a tool holder illustrating one orientation of the arm members and correspondingly the cutting tools or teeth according to the present invention.

As illustrated in FIG. 12, the tool holder 14 has a center arm member 92a, a left arm member 92b and a right arm member 92c. Each of the arm members 92a, 92b, 92c having a similar construction including respective apertures 102a, 102b, 102c. Each of the respective apertures 102a, 102b, 102c having a center point 154a, 154b, 154c. The tool holder 14 further includes mounting apertures 50a, 50b both having respective center points 156a, 156b. As set forth earlier the tool holder 14 is reversible; accordingly, the tool holder 14 is a mirror image about a plane 158 passing through the respective center points 154a, 156a, 156b of the arm member 92a and mounting apertures 50a, 50b and containing the longitudinal axes of the respective apertures 102a and mounting apertures 50a, 50b.

Figure 13:
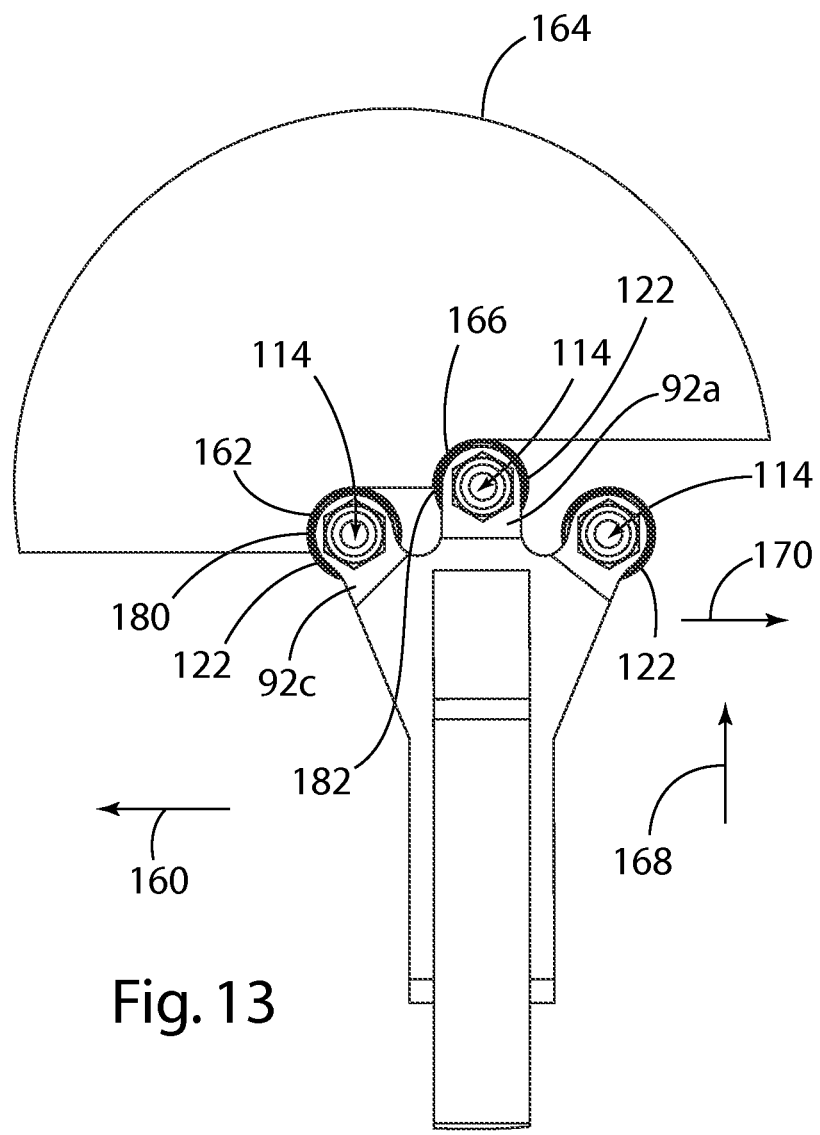
FIG. 13 is a partial schematic view showing the cut profile or path of a stump cutting apparatus according to the present invention.

As illustrated, the apertures 102b, 102c of each of the left arm member 92b and the right arm member 92c are spaced outwardly, and radially inwardly—toward the axis 22, from the aperture 102a located in the center arm member 92a. As illustrated the center points 154b, 154c of the apertures 102b, 102c are located or offset at an angle of 69° with respect to the plane 158. This angle and spacing of the center points 154b, 154c of the respective apertures 102b, 102c of the left arm member 92b and the right arm member 92c may vary depending upon the size and position of the cutting tip 122 of the cutting tooth 114 placed in the respective arm members 92a, 92b, 92c. For example, in one embodiment, when using a circular cutting tip 122 of the type disclosed herein, adjacent the cutting tips 122 are positioned such that the top of the cutting tip 122 located in aperture 102b is located at a point radially inwardly approximately one half of the diameter of an adjacent cutting tip 122 located in aperture 102a. See for example FIG. 13, wherein the cutting tip 122 of the cutting tooth 114 located in arm member 92c engages the workpiece or stump at point 180 and leaves cut path 162. As further illustrated, cutting tip 122 of the cutting tooth 114 located in arm member 92a engages the workpiece or stump at point 182 which is located at approximately half of the diameter of the cutting tip 122 and leaves a cut path 166. While the cut path 162 illustrated in FIG. 13 is not shown to encompass the entire semicircular portion of the cutting tip 122 of the cutting tooth 114 located in arm member 92c this is for illustration purposes only, it is contemplated to use one half of the cutting tip 122 of each cutting tooth 114 located in the respective arm members 92b, 92c.

As known, during a stump cutting or grinding operation the stump cutting apparatus typically moves or swings the cutting wheel back and forth in a side to side motion. Initially, the apparatus swings or moves the cutting wheel either to the right or to the left to cut or grind away a portion of the stump. Upon completing the first swing or pass, the cutting wheel moves forward towards the stump, after which the wheel swings in the opposite direction. FIG. 13 illustrates one example of the cut path or profile of the stump cutting apparatus 10 according to the present invention. As the apparatus 10 moves to the left, in the direction shown by arrow 160, the cutting tooth 114 located in the arm member 92c generates, as shown in the schematically illustrated stump, a cut profile 162 while the cutting tooth 114 located in the arm member 92a generates a cut profile 166. Once the cut path is completed in a direction 160, the cutting wheel 12 moves forward in the direction of the arrow 168 and the cutting wheel 12 then moves or swings to the right, that is in the direction of the arrow 170, whereby the cutting tooth 114 located in arm member 92b engages the stump 164 first and the cut path or profile is the same only in the opposite direction; that is the cutting tooth 114 located in the arm member 92b will cut first after which the cutting tooth 114 located in the arm member 92a, the center arm member, will also grind or cut the stump. It should be understood that as the wheel swings to the left and right or back and forth in the direction of the arrows 160, 170 the center cutting tooth 114 located in arm member 92a will cut in both directions while the respective side cutting teeth 114 cut in one direction only.

Figure 15A:
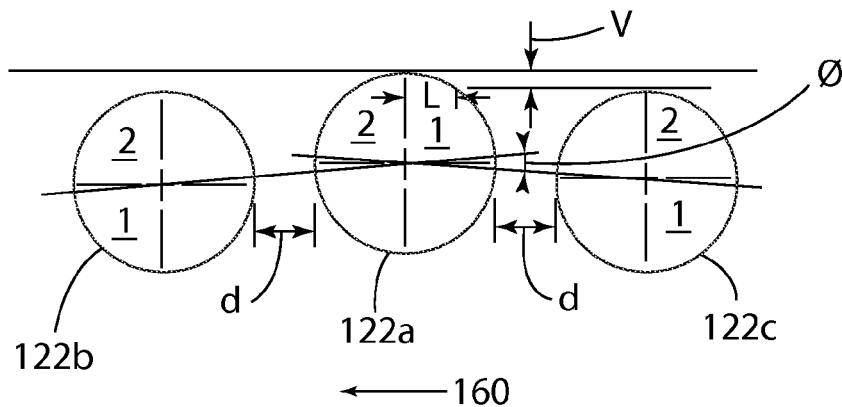
FIGS. 15a-15c are schematic illustrations of various positions of the cutting tip illustrating different patterns, locations or positions of the cutting tip according to the present invention.
Figure 15B:
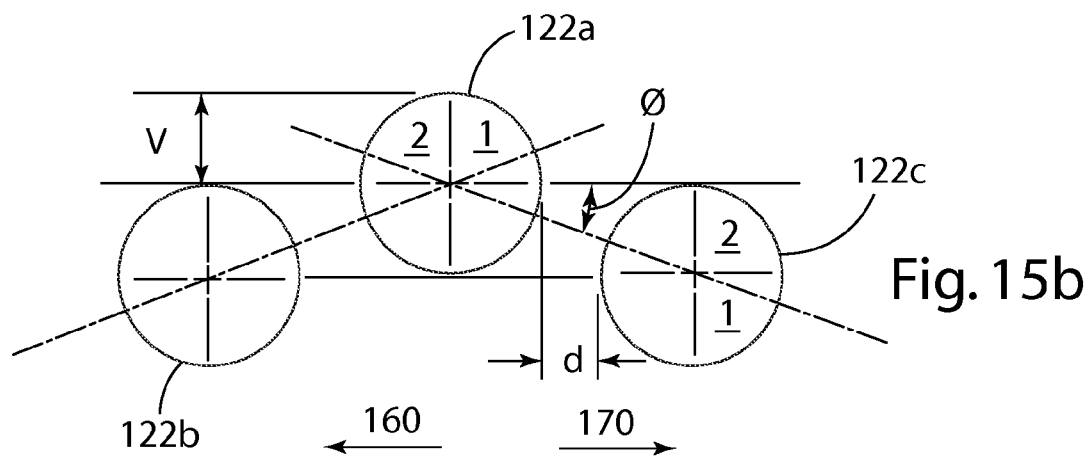
Figure 15C:
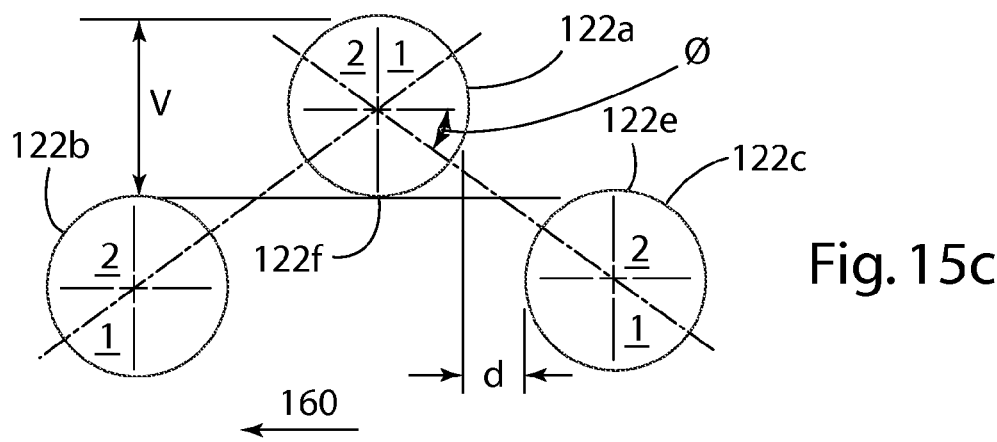

FIGS. 15a-c schematically illustrate different positions or locations of the respective cutting tips 122a-122c. As discussed, the arm members 92a-92c are oriented such that they position the cutting tips 122a-122c. FIGS. 15a-15c illustrate several preferred embodiments of the position of the respective cutting tips 122a-122c. For example, as illustrated in FIG. 15a of the cutting tips 122a-122c are spaced laterally to a distance (d) and are spaced vertically a distance (v). Accordingly, when moving through the cutting path or moving back and forth in the direction of the arrow 160 cutting tip 122c may engage the workpiece or stump at up to 180° of its periphery; that is, the area of the periphery located in quadrants 1 and 2. With respect to cutting tip 122a, only that periphery of the tip above the line (L) would engage the workpiece. Accordingly, as the angle (θ) increases the area or amount of the periphery of the cutting tip 122 and that engages the workpiece or stump increases, see FIGS. 15b and 15c. FIG. 15c illustrates the angle (θ) at 45°. When the angle (θ) reaches 45° 180° of the periphery of the cutting tip 122a, the periphery of the quadrants 1 and 2, will engage the workpiece as the top 122e of the cutting tip 122c is at the same vertical height or level as the bottom 122f of the cutting tip 122a. For example, if each cutting tip 122a and 122c had a diameter of 1 inch then the position of the cutting tips 122a and 122c would enable an operator to cut or grind a two (2) inch portion of the workpiece or stump in a single pass in the direction 170. Because the cutting tip 122b is mounted in a mirror image position of the of 122c the operator could then cut or grind a 2 inch portion of the workpiece or stump as the apparatus moves in a direction 160. Because the operator may not wish to fully engage the periphery of the cutting tip 122c; that is, cut with less than 180° of the periphery of cutting tip 122c, and use for example only 120° of the periphery of the cutting tip 122c, then the angle can be changed so a corresponding portion of the periphery of the cutting tip 122a would also only utilize 120° of the periphery of the cutting tip 122a.

FIG. 15b illustrates a cutting tip pattern or location wherein when the apparatus moves in the direction 170, 180° of the periphery of cutting tip 122c engages the workpiece and only 90° or quadrant 1, of the periphery of the cutting tip 122a engages the workpiece. However, when the apparatus travels in the other direction as illustrated by arrow 160 then 180° of the periphery of the cutting tip 122b engages the workpiece while only 90°, quadrant 2, of the periphery of the cutting tip 122a engages the workpiece. Accordingly, during operation only one half of the periphery of each cutting tip 122a-122c is used. Accordingly when the tooth becomes worn the tooth may be removed as set forth above and rotated to expose a new, fresh and sharp cutting tip.

As disclosed, the respective cutting tips 122a-122c of each of FIGS. 15a-15c are spaced a distance (d) which provides clearance between the respective cutting tips and allows for chip passage, flow and discharge. If for example, referring to FIG. 15c, changing only the angle (θ) to an amount greater than 45° results in a vertical space or gap between the top 122e the cutting tip 122c and the bottom 122f of the cutting tip 122a resulting in material that would not be removed. Further, it would decrease the distance (d) between the cutting tip 122a and 122c thus reducing the clearance space for chip passage, flow and discharge. The teeth 114 are placed in a substantially triangular formation with the center tooth 144a positioned in the plane of the wheel 12 with the outwardly positioned teeth 114b and 114c spaced from the respective sides of the wheel 12. That is, the center tooth 114a is located above the peripheral edge 20 and centered between the respective sides 12a and 12b of the wheel 12 with the outwardly positioned teeth 114b, 114c spaced accordingly.

As stated, FIGS. 15a-15c illustrate several examples of the tooth 114 placement. With one aspect of the present invention being that the arm members 92 allow infinitely variable tooth 114 placement whereby the cutting tips 122 can be placed in many different cutting positions. With the positions also variable depending upon the shape or configuration of the cutting tip 122; for example while shown as circular it could also be square, triangular or take other shapes.

Further, the can be arranged such that the arm members support the tooth 114 placement such that all of the cutting surfaces of the cutting tips 122a-122c are located above the peripheral edge 20 of the wheel 12.

Accordingly, the spacing and orientation of the respective cutting teeth 114 as determined by the position of the respective arm members 92a, 92b, 92c can be modified depending upon cutting tip configuration, the desired cut path or profile and the arc or path of the swing or back and forth movement of the cutting wheel.

While illustrated in FIG. 13 as moving in a lateral or back and forth direction, many stump cutting machines use cutting wheels that swing or pivot about a pivot point 190 whereby the cutting tools 114 travel in an arc 192, see FIG. 14. Accordingly, the position or orientation of the respective cutting teeth may vary depending upon the particular swing arc of the cutting tool; specifically, the cutting tools 114 located in respective left arm member 92b and right arm member 92c be positioned inward, closer to the plane 158 in order to ensure that the backside cutting tool 114; i.e. the cutting tool 114 located on the side opposite the direction of cutting wheel 12 swing or movement does not engage or rub on the stump. In the alternative, respective left arm member 92b and right arm member 92c may be positioned radially inward; however, radially inward movement is limited by the respective cut path or profile of the cutting tool 114 located in the center arm member 92a.

Figure 11B:
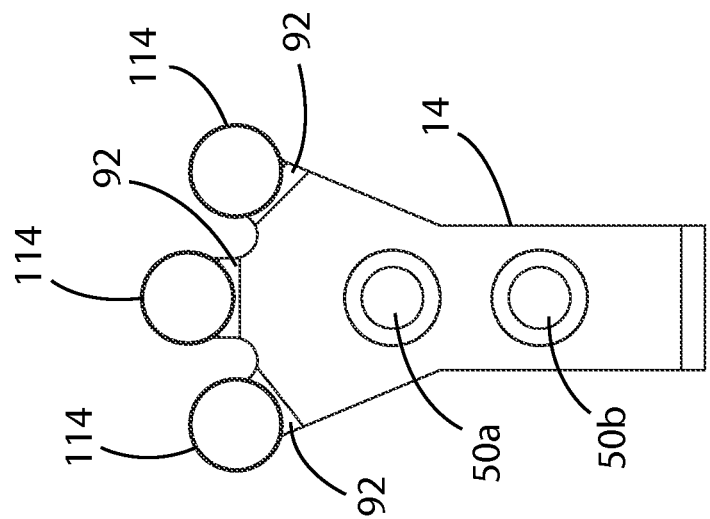
FIGS. 11a-11c are a perspective view of a tool holder and cutting tools or teeth secured thereto 11a, a front view of the tool holder and cutting teeth 11b and a side view of the tool holder and cutting tools or teeth 11c according to the present invention.
Figure 11A:
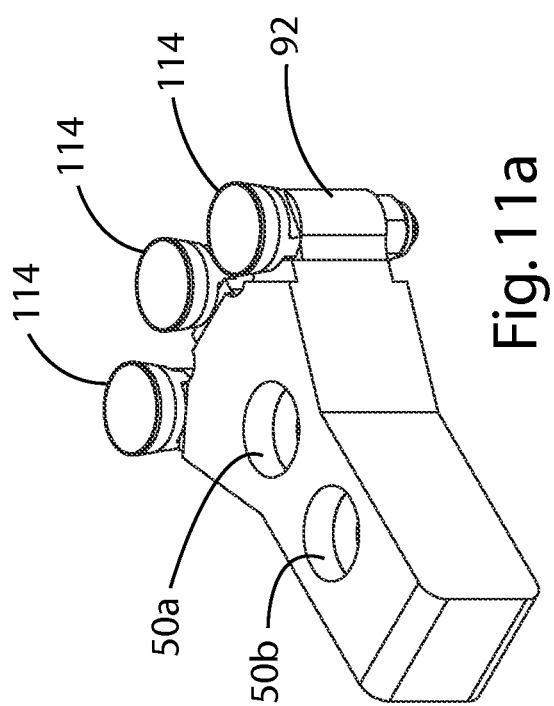
Figure 11C:
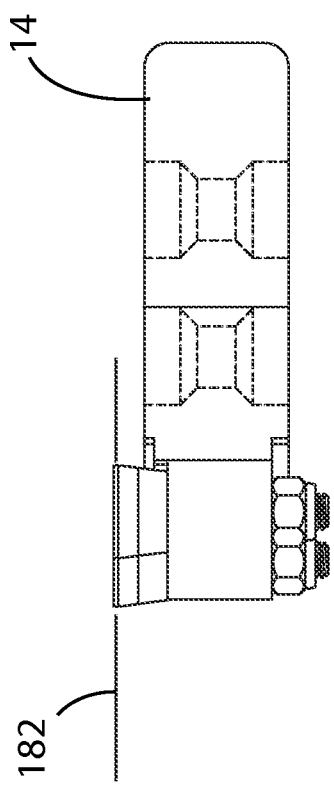

In addition, according to the present embodiment the cutting tips 122 of the respective cutting teeth 114 located in the center arm member 92a, left arm member 92b and right arm member 92c are all located in the same plane 182, see FIG. 1c and FIG. 11c. The plane 182 may extend across the plane of the cutting wheel 12. In one embodiment, the plane 182 is parallel to the plane of the support surface 30 and correspondingly to the front and rear surfaces 32, 54 of the tool holder 14. It may also be parallel to the axis of rotation 22. Wherein the shanks 134 of the respective cutting tools or teeth 114 extending transverse to a radial 41 extending outwardly from the axis 22. In another embodiment, the plane 182 contains the axis 22. That is, since the flat surfaces 110 of the respective first ends 96 of the bosses 96 of each of the center arm member 92a, left arm member 92b and right arm member 92c are all located in a common plane, see FIGS. 8a-8c, then the respective cutting tips 122 are also located in or contact a common plane, see FIG. 11c.

It may also be advantageous to stagger the spacing of the respective left arm member 92b and right arm member 92c and correspondingly that of the cutting teeth 114 associated therewith whereby they may be placed either behind or forward of the cutting tooth 114 located in the center arm member 92a. That is the plane 182 of the cutting teeth 114 located in the left arm member and right arm member 92b, 92c can be located ahead of or behind the plane of the cutting tooth 114 located in the center arm member 92a. As used herein ahead of means first in the direction of rotation 24; that is, a cutting tooth located ahead of another cutting tooth would engage the workpiece or stump first.

As illustrated, the stump cutting apparatus 10 includes a cutting wheel 12 and tool holder 14 combination as set forth above shows that the cutting tools or teeth 114 are located in the respective left arm member 92b and right arm member 92c at the same distance from the center point 22a of the axis 22 of the cutting wheel 12. Specifically as illustrated in FIG. 1a-1c and FIG. 2 the cutting wheel 12 has a rotational axis 22 and a center point 22a. In addition, four tool holders 14 are illustrated spaced about and mounted to the cutting wheel 12. Each of the tool holders 14 holding three cutting tools or teeth 114. Accordingly, all of the cutting tools or teeth 114 located in each of the respective right arm members 92c are located the same distance or are equidistant from the center point 22a. That is, the distance from the center point 154c of the right arm member 92c to the center point 22a is the same for each of the tool holder 14 mounted to the cutting wheel 12. Accordingly, all are at a common distance from the axis 22 and rotate in a common plane. As illustrated in FIG. 1b all of the cutting tools or teeth 114 are located in or rotate in a common plane 172. That is, all of the cutting tools or teeth 114 located in the left arm member 92a are all spaced the same horizontal or lateral distance from the side 12a of the wheel 12. Thus, as the wheel 12 rotates, all of the cutting tools or teeth 114 secured in the respective left arm member 92a rotate in the same circular path 180. Further, it is contemplated that the tool holder 14 may include additional arm members 92; for example, an additional arm member 92 can be added with the additional arm member extending outwardly further than the current arm member 92a. Accordingly, the lateral spacing from the wheel of the additional arm member would be greater than the lateral spacing of current arm member 92a. Should such additional arm members be added, the corresponding cutting tools or teeth located therein will all rotate in the same circular path.

Therefore it can be put in two ways, all of the cutting tools or teeth rotating the same circular path have the same lateral spacing from the side of the wheel or all of the teeth at a particular lateral spacing rotate in the same circular path centered about the axis 22 of the 12. Accordingly, additional tool holders can be added to the wheel 12, with the additional tool holders having cutting tools or teeth having different lateral spacing with respect to the side 12a of the wheel 12 or distance from the axis 22; however, for each cutting tool or tooth the spacing and distance must remain the same so that all of the teeth rotating in the same circular path must be spaced the same distance from the wheel. Further, it is contemplated that as the lateral spacing from the side 12a of the wheel 12 increases that the distance from the axis 22 decreases.

As set forth above, the same holds true for any other grouping of cutting tools or teeth 114 mounted in any of the other arm members 92a or 92b. Further, while shown with only three arm members 92a, 92b, 92c this is for the purposes of illustration only, adding additional arm members to the respective tool holder 14 is within the bounds of the current invention. Further, additional tool holders having different arm member configurations; i.e. tool holders having arm members supporting cutting tools or teeth positioned in the gaps or spaces between the arm members of the current tool holders. Specifically, while the cutting wheel 12 shows four tool holders 14 spaced approximately 90° from one another, it is contemplated that the cutting wheel 12 could be modified to include additional tool holders secured to the wheel 12 between the respective tool holders. These additional tool holders can have a different arm member configuration from the tool holders 14 and thus secure cutting tools or teeth that rotate in a different circular path.

Further, while the cutting tips 122 of the cutting tools or teeth 114 are shown having a generally circular concave or cup shaped surface, other cutting tip configurations such as square, triangular or oval including combinations or portions thereof are contemplated. Accordingly, depending upon the configuration or shape of the cutting tip, the arm members are positioned to enable cutting along a specific and predetermined cut path for each cutting tool or tooth 114.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A stump cutting apparatus comprising:
   a hub having an axis of rotation;
   a member extending outwardly from said hub and having a plane of rotation transverse said axis of rotation, said member including a first side surface, a second side surface, said first side surface and said second side surface generally parallel to the plane of rotation of said member, and a support surface extending between said first side surface and said second side surface, said support surface having a proximal end and a distal end with said proximal end being closer to said hub; and
   a tool holder secured to said support surface, said tool holder having a first arm, a second arm, and a third arm wherein said first arm supports a cutting tool located laterally outwardly of said first side surface, said second arm supports a cutting tool located laterally outwardly of said second side surface and said third arm supports a cutting tool located above a peripheral end of said member and generally between said first side surface and said second side surface.

2. A stump cutting apparatus as set forth in claim 1 including:
   said support surface having an aperture; and
   a fastener received in said aperture in said support surface securing said tool holder to said member.

3. A stump cutting apparatus as set forth in the claims 2 including:
   said member having an opening extending between said first side surface and said second side surface;
   a holder block positioned in said opening in said member wherein said fastener engages said holder block to secure said tool holder to said support surface.

4. A stump cutting apparatus as set forth in claim 1 including a cutting tool secured to said tool holder.

5. A stump cutting apparatus as set forth in claim 1 including said tool holder supporting a plurality of cutting tools, each of said cutting tools having a cutting face, each cutting face lying in a plane generally parallel to the axis of rotation.

6. A stump cutting apparatus as set forth in claim 1 including said tool holder supporting a plurality of cutting tools, said cutting tools spaced at a different radial distance from the axis of rotation.

7. A stump cutting apparatus as set forth in claim 1 wherein said support surface is parallel to the axis of rotation.

8. A stump cutting apparatus as set forth in claim 1 including a plurality of members extending from said hub and a support surface on each of said members, said support surfaces diametrically opposed such that said support surfaces lie in a common plane.

9. A stump cutting apparatus as set forth in claim 1 including said member having a notch adjacent said support surface and said tool holder positioned in said notch.

10. A stump cutting apparatus as set forth in claim 1 including said tool holder having an aperture extending through said tool holder from said front surface to said rear surface wherein said tool holder is a mirror image about a plane extending longitudinally between said front surface and said rear surface of said tool holder and perpendicular to said aperture in said tool holder.

11. A stump cutting apparatus as set forth in claim 1 including said tool holder having an aperture extending through said tool holder from said front surface to said rear surface, said aperture having a longitudinal axis; and
   said tool holder having a plurality of arms, each of said arms having an aperture therein each of said apertures in said arms having a longitudinal axis wherein the longitudinal axis of said aperture extending through said tool holder and the longitudinal axis of said aperture in said arms are parallel.

12. A stump cutting apparatus as set forth in claim 1 including said support surface having an aperture, said aperture in said support surface extending into said member between said first side surface and said second side surface;
   a fastener received in said aperture in said support surface securing said tool holder to said member; and
   said tool holder supporting a plurality of cutting tools wherein a first cutting tool is located laterally outwardly of said first side surface and a second cutting tool is located laterally outwardly of said second side surface.

13. A stump cutting apparatus as set forth in claim 1 including said support surface having a first aperture and a second aperture, said first aperture located at a different distance from said axis of rotation than said second aperture.

14. A stump cutting apparatus as set forth in claim 1 including a plurality of members extending from said hub and a support surface on each of said members, a tool holder secured to each of said support surfaces, each of said tool holders supporting a plurality of cutting tools including a first cutting tool located laterally outwardly of said first side surface and a second cutting tool located laterally outwardly of said second side surface wherein the first cutting tools located laterally outwardly of said first side surface all lie in a first common plane transverse said axis of rotation and the second cutting tools located laterally outwardly of said second side surface all lie in a second common plane transverse said axis of rotation.

15. A stump cutting apparatus comprising:
   a hub having an axis of rotation;
   a member extending outwardly from said hub and having a plane of rotation transverse said axis of rotation, said member including a first side surface, a second side surface, said first side surface and said second side surface generally parallel to the plane of rotation of said member, and a support surface extending between said first side surface and said second side surface, said support surface having a proximal end and a distal end with said proximal end being closer to said hub, said support surface having an aperture, said aperture in said support surface extending into said member between said first side surface and said second side surface.; and a tool holder, said tool holder having a base portion including a first side surface, a second side surface, a front surface and a rear surface, an aperture extending through said base portion from said front surface to said rear surface, said tool holder positioned such that said rear surface of said tool holder is located adjacent said mounting surface of said member, said tool holder having a first arm, a second arm, and a third arm wherein said first arm supports a cutting tool located laterally outwardly of said first side surface, said second arm supports a cutting tool located laterally outwardly of said second side surface and said third arm supports a cutting tool located above a peripheral end of said member and generally between said first side surface and said second side surface;

a fastener, said fastener extending through said aperture in said base portion of said tool holder and into said aperture located in said support surface; and said tool holder supporting a plurality of cutting tools wherein a first cutting tool is located laterally outwardly of said first side surface and a second cutting tool is located laterally outwardly of said second side surface.

16. A stump cutting apparatus as set forth in claim 15 including a plurality of members extending from said hub and a support surface on each of said members, said support surfaces diametrically opposed such that said support surfaces lie in a common plane.

17. A stump cutting apparatus as set forth in claim 15 including a plurality of members extending from said hub and a support surface on each of said members, a tool holder secured to each of said support surfaces, each of said tool holders supporting a plurality of cutting tools including a first cutting tool located laterally outwardly of said first side surface and a second cutting tool located laterally outwardly of said second side surface wherein the first cutting tools located laterally outwardly of said first side surface all lie in a first common plane transverse said axis of rotation and the second cutting tools located laterally outwardly of said second side surface all lie in a second common plane transverse said axis of rotation and wherein the first cutting tools lying in a first common plane are located at a common radial distance from the axis of rotation and the second cutting tools lying in a second common plane are located at a common radial distance from the axis of rotation.

18. A stump cutting apparatus comprising:

a hub having an axis of rotation;

a support segment extending radially from said hub, said support segment including a first side surface, a second side surface, a mounting surface and a rear surface, said mounting surface extending between said first side surface and said second side surface said mounting surface having a proximal end and distal end, with said proximal end being closer to said axis of rotation; and said distal end located at a peripheral end of said support segment;

said support segment having an opening extending from said first side surface to said second side surface and located between said mounting surface and said rear surface, said support segment further having an aperture extending from said mounting surface to said opening;

a tool holder, said tool holder having a base portion including a first side surface, a second side surface, a front surface and a rear surface, an aperture extending through said base portion from said front surface to said rear surface, said tool holder positioned such that said rear surface of said tool holder is located adjacent said mounting surface of said support segment, said tool holder having a first arm, a second arm, and a third arm wherein said first arm supports a cutting tool located laterally outwardly of said first side surface, said second arm supports a cutting tool located laterally outwardly of said second side surface and said third arm supports a cutting tool located above a peripheral end of said support segment and generally between said first side surface and said second side surface;

a fastener, said fastener extending through said aperture in said base portion of said tool holder and said aperture of said support segment; and a holder block positioned in said opening in said support segment wherein said fastener engages said holder block to secure said tool holder to said support segment.

19. A stump cutting apparatus as set forth in claim 18 including said tool holder supporting a first cutting tool is located laterally outwardly of said first side surface and a second cutting tool is located laterally outwardly of said second side surface; and said first cutting tool having a cutting face and said second cutting tool having a cutting face wherein said cutting face of said first cutting tool and said cutting face of said second cutting tool lie in a common plane, said common plane generally parallel to a plane containing the axis of rotation.

* * * * *